(12) United States Patent
Gauthier et al.

(10) Patent No.: US 7,954,048 B2
(45) Date of Patent: May 31, 2011

(54) CONTENT MANAGEMENT VIA CONFIGURATION SET RELATIONSHIPS IN A CONTENT MANAGEMENT SYSTEM

(75) Inventors: Charles S. Gauthier, Rochester, MN (US); David G. Herbeck, Rochester, MN (US); John E. Petri, Lewiston, MN (US); Gary R. Summer, Hatboro, PA (US)

(73) Assignee: International Business Machines Corporation, Armonk, NY (US)

( * ) Notice: Subject to any disclaimer, the term of this patent is extended or adjusted under 35 U.S.C. 154(b) by 1282 days.

(21) Appl. No.: 11/533,811

(22) Filed: Sep. 21, 2006

(65) Prior Publication Data

US 2008/0077850 A1   Mar. 27, 2008

(51) Int. Cl.
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)

(52) U.S. Cl. ..... 715/229; 715/234; 715/236; 707/999.1; 707/E17.008

(58) Field of Classification Search ............ 715/234, 715/229, 239, 236, 255; 707/203, 102, 999.1, 707/17.006, E17.006, E17.008
See application file for complete search history.

(56) References Cited

U.S. PATENT DOCUMENTS

| | | | |
|---|---|---|---|
| 6,507,857 B1 * | 1/2003 | Yalcinalp | 715/235 |
| 7,086,000 B2 * | 8/2006 | LaMarca et al. | 715/234 |
| 7,089,365 B2 * | 8/2006 | Brown et al. | 711/133 |
| 7,395,271 B2 * | 7/2008 | Idicula et al. | 1/1 |
| 7,568,182 B2 * | 7/2009 | Villaron et al. | 717/121 |
| 2002/0026296 A1 * | 2/2002 | Lohmann et al. | 703/1 |
| 2003/0110176 A1 * | 6/2003 | Morgan et al. | 707/100 |
| 2004/0205656 A1 * | 10/2004 | Reulein et al. | 715/530 |
| 2005/0138540 A1 * | 6/2005 | Baltus et al. | 715/511 |
| 2005/0149543 A1 * | 7/2005 | Cohen et al. | 707/100 |
| 2005/0251740 A1 * | 11/2005 | Shur et al. | 715/517 |
| 2005/0268280 A1 * | 12/2005 | Fildebrandt | 717/113 |
| 2005/0273698 A1 * | 12/2005 | Smith et al. | 715/511 |
| 2006/0174186 A1 * | 8/2006 | Caro et al. | 715/500 |
| 2008/0010588 A1 * | 1/2008 | Wake et al. | 715/234 |
| 2008/0028293 A1 * | 1/2008 | Seliutin et al. | 715/234 |

* cited by examiner

*Primary Examiner* — Stephen S Hong
*Assistant Examiner* — Nicholas R Hasty
(74) *Attorney, Agent, or Firm* — Patterson & Sheridan, LLP

(57) ABSTRACT

Method, system, and article of manufacture for a content management system (CMS) to bind a data object (typically, an XML document) to an associated configuration set (or sets) are disclosed. The configuration set may reference a set of configuration files such as XML schemas/DTDs, style sheets, CMS processing rules, and the like. The CMS may store bindings between a data object and a given configuration set in a CMS repository.

20 Claims, 5 Drawing Sheets

CONTENT MANAGEMENT VIA CONFIGURATION SET RELATIONSHIPS IN A CONTENT MANAGEMENT SYSTEM

BACKGROUND OF THE INVENTION

1. Field of the Invention

Embodiments of the invention are generally related to managing a collection of data objects in a content management system. More specifically, embodiments of the invention are related to a method and system for managing XML documents stored in a content management system using configuration set relationships.

2. Description of the Related Art

Content management systems (CMS) allow multiple users to share information. Generally, a CMS system allows users to create, modify, archive, search, and remove data objects from an organized repository. The data objects managed by CMS may include documents, spreadsheets, database records, digital images and digital video sequences, to name but a few. A CMS typically includes tools for document publishing, format management, revision and/or access control, along with tools for document indexing, searching, and retrieval.

A CMS may be configured with rules for processing documents whenever documents flow into or out of the repository. For example, rules may be defined for XML documents in the repository to provide additional functions such as bursting of XML fragments and synchronization of content with attributes. Often these rules are included with a logical collection of other XML configuration artifacts such as DTDs, schemas, style sheets, etc. This collection of XML configuration artifacts is referred to as a configuration set. In order to be processed correctly, XML documents must be associated with the proper configuration set; for example, a configuration set that matches the grammar or document type of the document being processed. Some CMS systems select a collection of XML configuration artifacts based on the content of the XML document and other repository attributes. Such systems however, typically rely on a static directory structure and a limited collection of attributes to manage the XML configuration artifacts for a given document. Problems may arise with this approach when the CMS contains multiple configuration sets that are very similar. A CMS typically tries to automatically determine the correct configuration set to associate with an XML document in the repository; however, if all of the factors that determine this association, such as DTD name, schema, or other repository attributes, are identical for more than one configuration set, then the CMS may not be able to determine which configuration set to use. This could be the case when two or more XML documents are very similar but have subtle differences; for example, they use different style sheets. Since a small difference such as a different style sheet would not likely affect the CMS' matching algorithm, the system may be unable to determine which configuration set to use or may choose an incorrect one.

Further, document types using specialized or industry specific grammars often include references to other documents. For example, document types may have a parent child relationship or a compound document backbone may be used to support any number of modules. A good example of this scenario occurs in the field of regulatory compliance in the pharmaceutical industry. The International Conference on Harmonisation of Technical Requirements (ICH) has published a standard set of XML files for governing electronic drug submissions to the FDA (known as eCTD—electronic common technical document). The eCTD is basically an XML backbone that references additional supporting documents. Some of its supporting documents are also XML documents governed by their own grammar. However, when the user creates a new eCTD document, the supporting XML documents should be associated with their own sets of XML related artifacts (DTDs, schemas, etc) and these associations should be transparent to the user. Current approaches, however, to managing documents fail to address these types of complex compound document structures.

Similarly, situations often arise where multiple versions of a DTD or schema need to be effective at the same time for a particular document type. However, the approach of statically linking a document type to a particular set of related files does not provide the ability to associate different versions of a DTD or schema (or any XML configuration artifact for that matter) to documents of a particular type. For example, assume that a regulatory organization has published version 3.0 and version 4.0 of a document specification governing new drug applications, the organization may agree to accept documents based on version 3.0 until some specified date, at which point relevant parties must submit documents based on version 4.0. A company may have several in-progress documents that have been developed according to version 3.0 and that will be submitted until the new version is required, but the company would like to create all new documents using the 4.0 schema.

Accordingly, there remains a need for techniques for managing configuration sets (e.g., a collection of XML schemas, DTDs, style sheets, transforms, etc.) for documents stored in a content management system.

SUMMARY OF THE INVENTION

Embodiments of the invention include a method for managing documents in a CMS. The method generally includes receiving a request to create a document of a specified document type and prompting a user to specify one or more attributes associated with the document. Based on the specified attributes and the specified document type, a configuration set for the document may be selected. The configuration set may specify one or more configuration files that include content for managing the document. The method may further include generating the requested document and binding the document to the selected configuration set. For example, the configuration files specified by a configuration set may include one or more XML schemas, document type definitions (DTDs), XSL style sheets, XML catalogs, XSLT transforms, CMS processing rules, and the like.

Embodiments of the invention also include a computer-readable storage medium containing a program which, when executed, performs an operation for managing documents in a CMS. The operation generally includes receiving a request to create a document of a specified document type and prompting a user to specify one or more attributes associated with the document. Based on the specified attributes and the specified document type, a configuration set for the document type may be selected. The configuration set specifies one or more configuration files that include content for managing the document. The operation may generally further include generating the requested document and binding the document to the selected configuration set.

Embodiments of the invention also include a system having a processor and a memory containing a CMS program configured to perform a method for managing documents in a content management system. The method performed by the CMS program may include receiving a request to create a document of a specified document type and prompting a user to specify one or more attributes associated with the document. Based on the specified attributes and the specified document type, a configuration set for the document type may be selected. The configuration set may specify one or more configuration files that include content for managing the document. The method may further include generating the requested document and binding the document to the selected configuration set.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
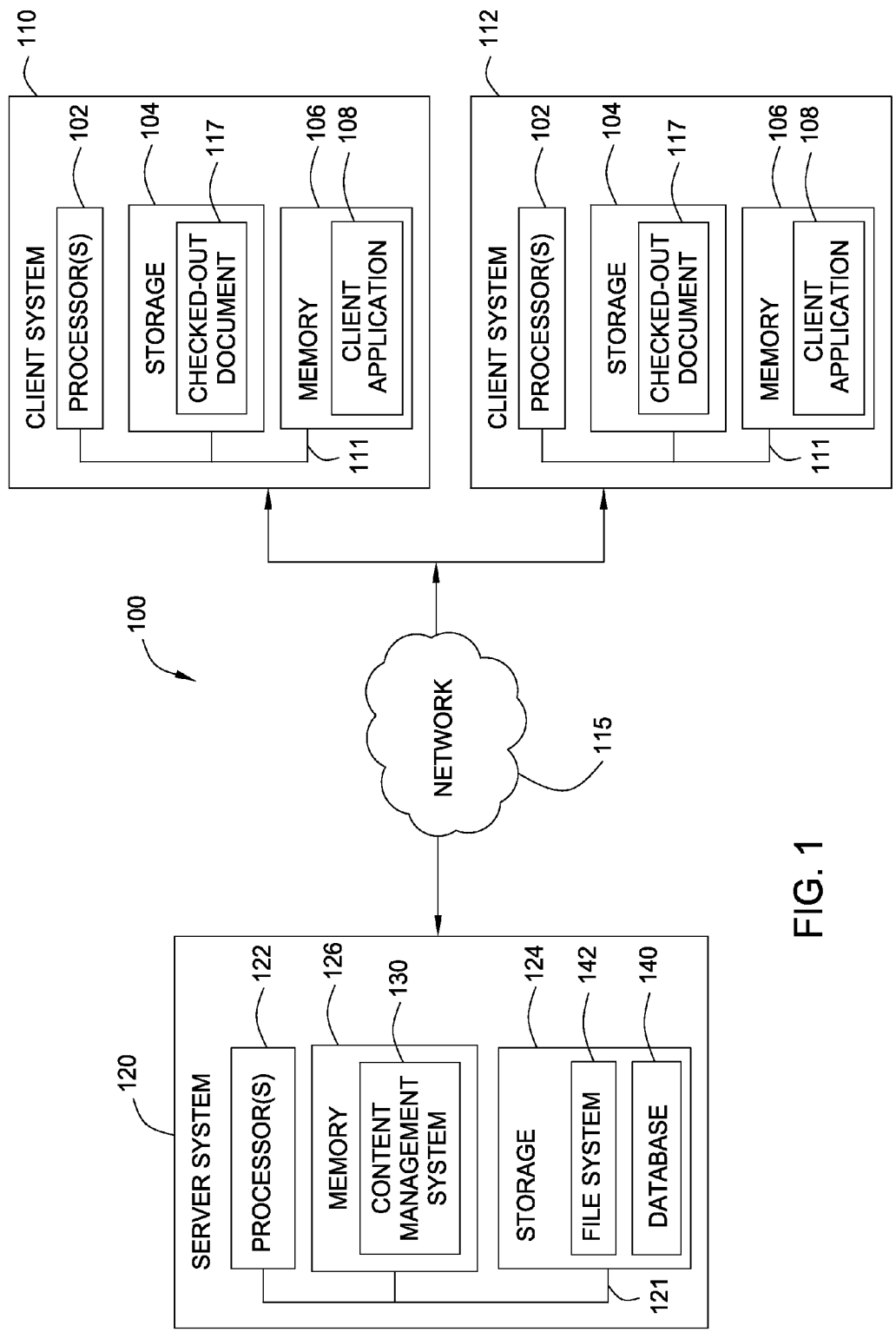
FIG. 1 is a block diagram illustrating a computing environment and CMS, according to one embodiment of the invention.

Embodiments of the invention provide for binding a data object (typically, an XML document) to an associated configuration set (or sets). A content management system (CMS) may store the data objects and bindings. Generally, the CMS may maintain a collection of repository relations, where each relation specifies a binding between a source object and a target object. The binding may be configured to point to a specific version of the source and target, or the binding may "float" with the latest versions of the source and target. In one embodiment, the source object is an XML document, and the target object is a configuration set specifying a collection of related artifacts such as DTDs, schemas, style sheets, etc. needed to manage the XML document.

Because a document's configuration set is maintained as an independent object in the CMS repository, the configuration set can itself contain repository relationships to its associated XML-related artifacts. For example, the configuration set may be implemented as an XML-based compound document with child relationships to a DTD, schemas, style sheets, etc. This allows the artifacts to be located anywhere in the system and allows for much greater flexibility in binding them to the XML configuration set (e.g. they can be bound by specific version or latest version—an improvement over current systems) and indirectly to documents stored in the CMS repository.

The repository relationship between a document and configuration set may be changed by reassigning the repository relationship for the document. That is, a document bound to one configuration set may later be bound to another configuration set. This might be triggered automatically by metadata in the XML document, a lifecycle state change, or when the configuration set moves to a new version. This is very useful for making compatible changes to an XML configuration set, as binding rules can be set up to allow source documents to automatically follow the latest version of a configuration set. Thus, the changes to the configuration set can be picked up seamlessly by source documents without any user action.

Additionally one document may be bound to multiple configuration sets. This is particularly useful for documents that logically represent multiple XML grammars, such as the eCTD. Similarly, multiple "minor" versions of the same grammar can be configured for potential binding. For example, there may be multiple configuration set versions defined for the same grammar, with each configuration set version binding a source document to different style sheets. Also, by tying an XML configuration set to a document via a repository relation, CMS functionality may be configured to manage the bindings for a document or group of documents. In such a case, the CMS may be configured to notify document owners when an XML configuration set reaches a particular state (e.g. obsolete, or end-of-life).

Embodiments of the invention are described herein adapted for use with the widely used XML markup language. Accordingly, references to data objects, documents, and XML documents generally refers to data marked up using a well-formed collection of XML tags, elements and/or attributes. As is known, an XML document may be used to describe virtually any type of data. For example, XML grammars have been used to describe word processing documents, spreadsheets, database records, digital images and digital video, to name but a few. Further, specialized grammars are frequently specified by a domain specific XML schema (e.g., the eCTD specification) and may include additional artifacts such as a document type definition (DTD), XSLT transforms XSL style sheets, and other associated files, tools and utilities. However, the invention is not limited to the XML markup language, XML schemas, and the use of XML documents; rather, embodiments of the invention may be adapted to other markup languages or other data object formats or data representations, whether now known or later developed.

Further, the following description references embodiments of the invention. However, it should be understood that the invention is not limited to any specifically described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media on which information is permanently stored (e.g., read-only memory devices within a computer such as CD-ROM or DVD-ROM disks readable by a CD- or DVD-ROM drive); (ii) writable storage media on which alterable information is stored (e.g., floppy disks within a diskette drive, hard-disk drives, or flash memory devices). Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client/server view of a computing environment 100, according to one embodiment of the invention. As shown, computing environment 100 includes two client computer systems 110 and 112 communicating with a server system 120 over a network 115. The computer systems 110, 112, and 120 illustrated in environment 100 are included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Additionally, those skilled in the art will recognize that the illustration of computer systems 110, 112, and 120 are simplified to highlight aspects of the present invention and that computing systems and networks typically include a variety of additional elements not shown in FIG. 1.

As shown, client computer systems 110 and 112 each include a CPU 102, storage 104, and memory 106 connected by a bus 111. CPU 102 is a programmable logic device that performs all the instructions, logic and mathematical processing performed in executing user applications (e.g., a client application 108). Storage 104 stores application programs and data for use by client computer systems 110 and 112. Typical storage devices 104 include hard-disk drives, flash memory devices, optical media and the like. Additionally, the processing activity and access to hardware resources made by client application 108 may be coordinated by an operating system (not shown). Well known examples of operating systems include the Windows® operating system, distributions of the Linux® operating system, among others. (Linux is a trademark of Linus Torvalds in the US, other countries, or both). Network 115 represents any kind of data communications network, including both wired and wireless networks. Accordingly, network 115 is representative of both local and wide area networks, including the Internet.

Illustratively, memory 106 of client computer systems 110 and 112 includes a client application 108. In one embodiment, client application 108 is a software application that allows users to access documents stored by a content management system (CMS) 130. Thus, client application 108 may be configured to allow users to create, edit, and save a documents, e.g., word-processing documents, spreadsheets, database records, digital images or video data objects, to name but a few (collectively referred to as a "documents") from CMS 130. In one embodiment, client application 108 may be configured to receive a document 115 from CMS 130 and store it in storage 104 while it is being accessed by client application 108.

Documents accessed from CMS 130 may be marked up with XML tags describing the substantive data within the document, relative to an associated XML schema. Additionally, in one embodiment, documents in CMS 130 may be bound to a configuration set. As stated, a configuration set may specify a collection of related artifacts such as DTDs, schemas, stylesheets, etc., that should be used to manage the XML document. When a new document is created (e.g., a new root or backbone for an eCTD) CMS 130 may prompt the user to specify attributes for the document. The CMS 130 may then use the attributes to filter a collection of potential configuration sets and prompt the user to specify a configuration set to bind with the new document. The CMS 130 then stores the binding between the document and the configuration set as a repository relation. Additionally, for a compound document such as the eCTD, CMS 130 may create a collection of child documents and bind them to the appropriate configuration sets, prompting the user to specify attribute values as necessary. Thereafter, anytime the XML document (or any of its related child documents) is accessed from CMS 130, the repository relation specifies which configuration set (and associated artifacts) should be used to manage the XML document.

The CMS 130 may be further configured to provide lifecycle management for a given configuration set. For example, versions of documents in the configuration set may change over time, and the configuration set may be configured to always refer to the current version of a given element of the configuration set (e.g., the most current version of a style sheet, DTD or schema). Alternatively, a configuration may also refer to a specific version of a document in the configuration set. This may be useful when different available versions of a document referenced by the configuration set are incompatible with one another.

Server system 120 also includes a CPU 122, CMS storage repository 124, and a memory 126 connected by a bus 121. CMS repository 124 may include a database 140 and file system 142. File system 142 typically provides access to a directory structure contained on a disk drive or network file system and may be used to store files (e.g., documents managed by CMS 130). Database 140 may contain additional information and metadata related to documents stored in file system 142. Memory 126 of server system 120 includes CMS 130. As stated, CMS 130 may provide an application program configured for creating, modifying, archiving, and removing content managed by CMS 130. Thus, CMS 130 may include tools used for publishing, format management, revision and/or access control, content indexing, and facilities for performing searches and other operations related to documents managed by CMS 130.

Figure 2:
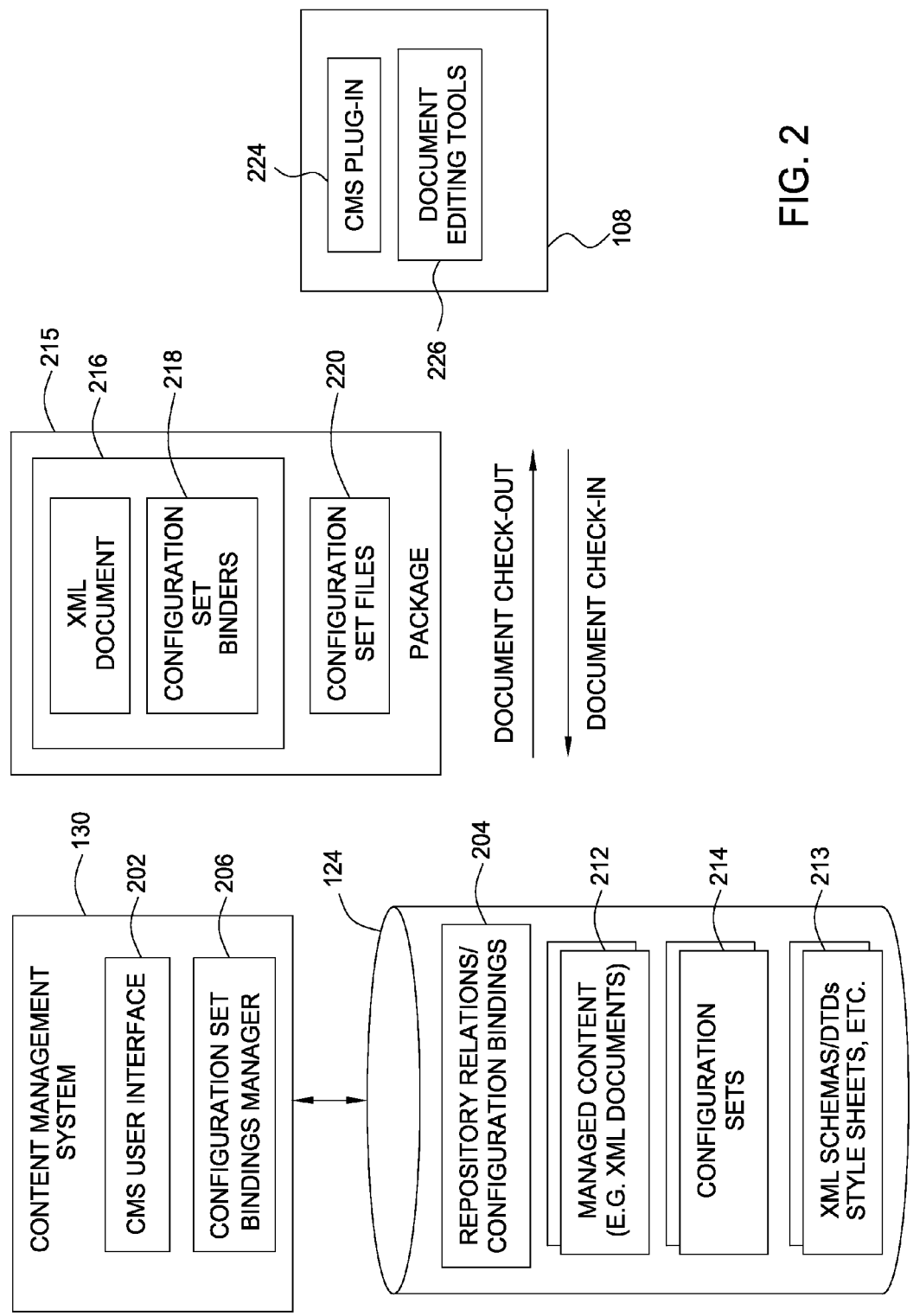
FIG. 2 is a block diagram illustrating a client application used to access data objects managed by a CMS, according to one embodiment of the invention.

FIG. 2 is a block diagram illustrating a client application 108 being used to access documents managed by CMS 130, according to one embodiment of the invention. As shown, CMS 130 includes a CMS user interface 202 and a configuration set bindings manager 206. Those skilled in the art will recognize that the CMS 130 illustrated in FIG. 2 is simplified to highlight aspects of the present invention and that CMS systems typically include a variety of additional elements not shown in FIG. 2.

Generally, user interface 202 provides an interface to the functionality of CMS 130 and managed content 212 stored by database 140 and file system 142. Thus, user interface 202 may provide an interface for checking in/out a document from CMS 130, for creating, viewing, and exporting documents from CMS 130 etc. Additionally, user interface 202 may provide mechanisms that allow a user to define a configuration set 214, to create a binding 204 between a particular document and configuration set 214, and to edit an existing configuration set 214. Configuration set bindings manager 206 represents the components of CMS 130 configured to manage repository relations 204 and configuration sets 214.

Repository relations 204 specify the bindings between managed documents 212 and configuration sets 214. In other words, repository relations 204 specify which bindings are in effect for a given document 212. Each configuration set 214 may specify a collection of related files to associate with a document bound to that configuration set 214. For example, a configuration set 214 may specify a collection of artifacts used to manage, validate, and/or process a document bound to that configuration set, such as such as DTDs, schemas, style sheets, transforms, etc. needed to manage the document.

An XML schema/DTD generally defines the allowed content and structure of a given type of XML document. More specifically, XML schemas/DTDs provide rules specifying which elements (e.g., the markup tags) and attributes (i.e., values associated with specific tags) are allowed for a particular type of XML document. For example, the eCTD includes a set of XML schemas/DTDS specifying the allowed structure and content for an eCTD backbone document and related child documents. Each child document in the eCTD may itself be governed by its own grammar and schema. Accordingly, in one embodiment, a root document (e.g., and eCTD backbone) may be bound to a configuration set 213 for the root document, as well as bound to configuration sets appropriate for each child document (e.g., each eCTD module). In addition to XML schema/DTDs 213, a configuration set 214 may reference other files such as a style sheet, transforms (e.g., transforms used to generate an HTML or XHTML document from a source XML document) etc.

FIG. 2 also shows document package 215 being checked out/in from the CMS 130. In one embodiment, when a document 216 flows out of repository 124, CMS 130 may be configured to determine which configuration set 214 the document 216 is bound to and include that set with the document package 215 (shown in FIG. 2 as configuration set binding 218). Additionally, the CMS 130 may be configured to include the configuration files 220 referenced by the configuration set binding 218 with document package 215, and to return it to the requesting user. Configuration set files 220 may include the XML schema(s), DTDs, style sheets, transforms, catalogs, etc., which are referenced by the configuration set 218.

As shown, client application 108 includes a CMS plug-in 224 and document editing tools 226. CMS plug-in 224 allows client application 108 to interact with CMS 130. For example, plug-in 224 may allow a user interacting with client application 108 to check-in and check-out documents (e.g., document package 215) from CMS 130. Additionally, CMS plug-in 224 may allow users to select a configuration set binding when creating a new document to store in repository 124 (e.g., a new eCTD backbone and associated child documents). Document editing tools 226 provide the substantive features associated with a particular client application. For example, a word processing application may provide tools for specifying document presentation style and text-content or a web-browser may be used to render, view, and update an XML document 216. Of course, depending on the function of client application 108, the features provided by viewing/editing tools 226 will vary.

Figure 3:
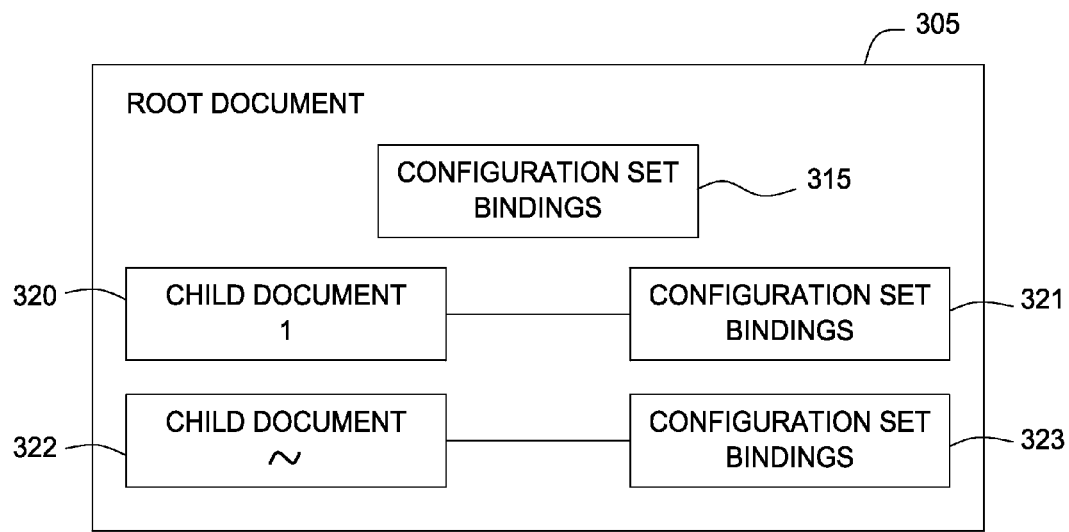
FIG. 3 illustrates an example XML root document that includes configuration set bindings for the root document, as well as bindings for multiple child documents, according to one embodiment of the invention.

FIG. 3 illustrates an example root document 305 managed by CMS 130, according to one embodiment of the invention. As shown, root document 305 includes a configuration set binding 315 used to specify the configuration set associated with the root document 315. Root document 305 also includes child "document 1" 320 and child "document N" 322. This structure is similar to that of the eCTD, where a backbone document references multiple child documents (referred to by the eCTD as modules). However, in addition to the compound document structure, root document 305 includes configuration set bindings 321 and 323 associated with child documents 320 and 322, respectively. This example illustrates how a single root document may be bound to multiple configuration sets. By binding the parent document 305 to configuration sets 321 and 323 associated with its child documents, the correct set of configuration files (e.g., XML grammar, XML schema, DTD, etc) the children documents may be readily identified whenever the parent document is accessed by a requesting user.

Figure 4:
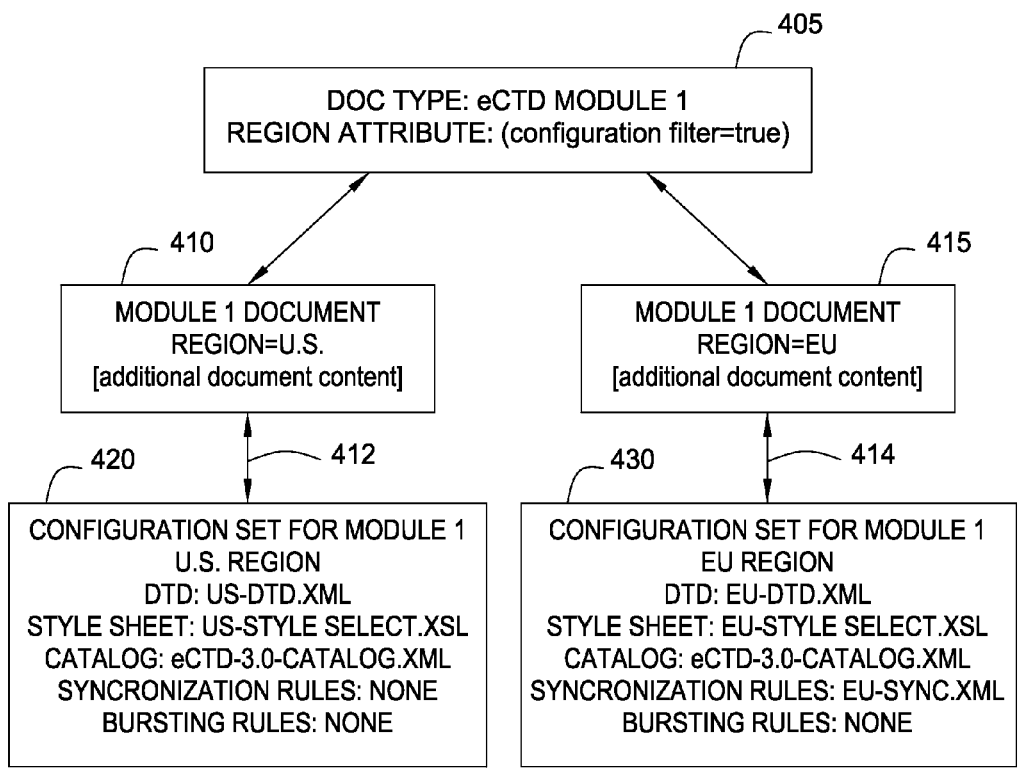
FIG. 4 illustrates a collection of configuration set relationships for an exemplary document type, according to one embodiment of the invention.

FIG. 4 illustrates a collection of configuration set relationships for an exemplary document type, according to one embodiment of the invention. As shown, a document type of "eCTD module 1" includes a region attribute. In this example, assume that the region attribute is used by the CMS 130 to select which configuration set 214 a document of this type should be bound.

FIG. 4 illustrates two instances of the "eCTD module 1" document type 405. Specifically, an "eCTD module 1" document 410 with the region attribute set to "US" and an "eCTD module 1" document 415 with the region attribute set to "EU." Illustratively, documents 410 and 415 are bound to the appropriate configuration set, based on the region type (illustrated by arrows 412 and 414). Specifically, document 410 is bound to configuration set 420, a configuration set for the US region. Document 415 is bound to configuration set 430, a configuration set for the EU region. Additionally, configuration sets 420 and 430 each include references to a set of configuration files that should be used in processing the respective documents 410 and 415. For example, the configuration set 420 references a DTD of "US-DTD.XML" for document 410. Similarly, configuration set 430 references a DTD of "EU-DTD.XML." for document 415. By managing a collection of artifacts associated with a given document type using a configuration set, changes made to the configuration set are automatically incorporated by documents bound with that configuration set. Thus, whenever a document is accessed, the CMS may also identify and provide the correct set of related files used to manage the document.

Figure 5:
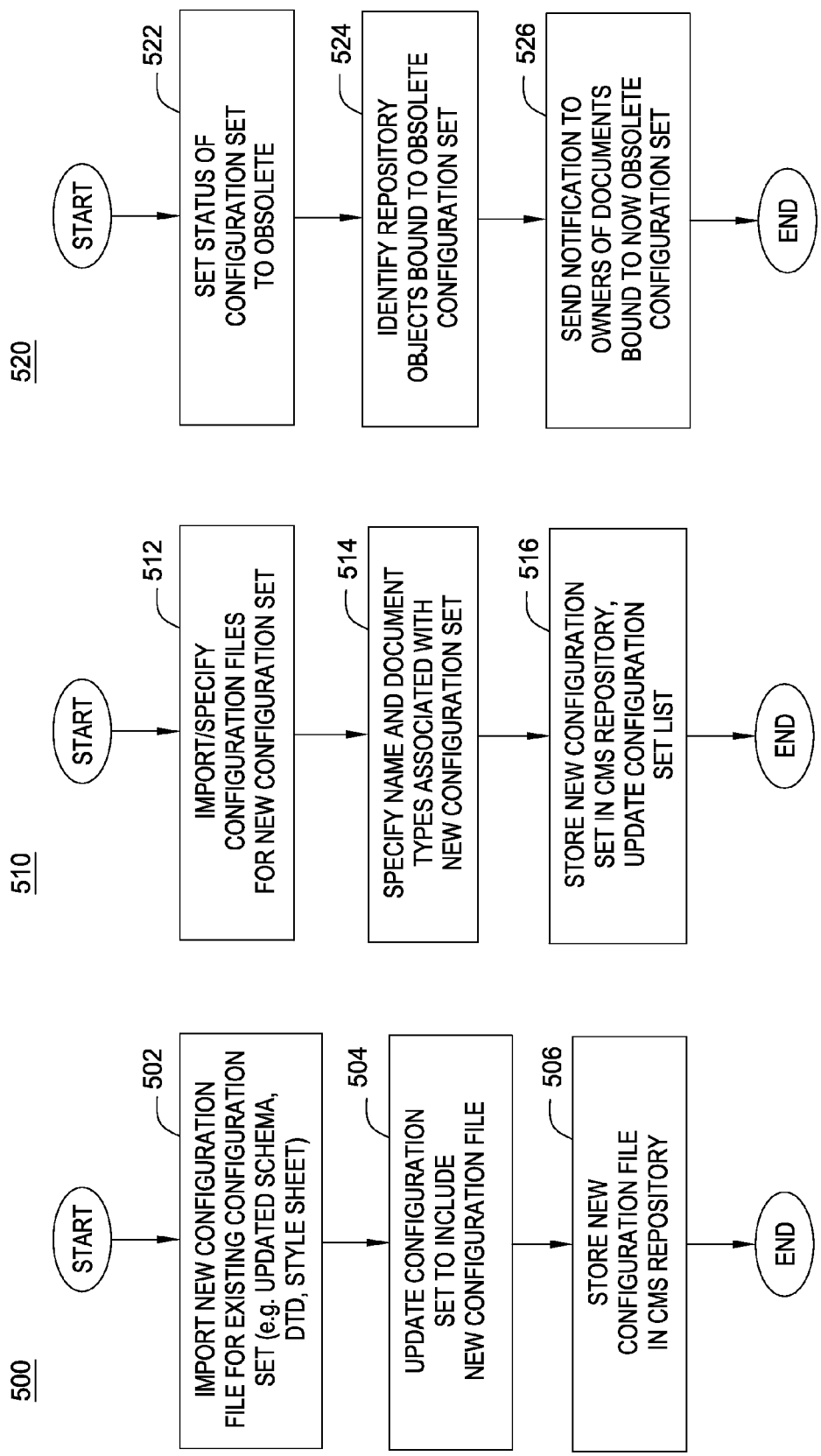
FIGS. 5A-5C illustrate methods for managing configuration set relationships that may be bound to XML documents stored in a content management system according to one embodiment of the invention.

FIGS. 5A-5C illustrate methods for managing XML documents stored in CMS 130 using configuration set relationships. FIG. 5A illustrates a method 500 for modifying a configuration set available for binding to documents stored in CMS 130, according to one embodiment of the invention. The method 500 begins at step 502 where a new configuration file for an existing configuration set is imported into CMS repository 124. At step 504, the configuration set may be updated to include the new file. If the new file replaces an existing one, this may occur automatically. For example, a CMS administrator may import an updated DTD or style sheet that has the same name as an existing DTD or style sheet in the repository 124. Assuming that the updated DTD or style sheet is referenced from an existing configuration set 214, documents bound to this configuration set will automatically use the updated DTD. This scenario is useful for making compatible changes to a configuration file since each configuration set 214 (and by extension, the documents 212 bound to such configuration set) that reference the changed DTD or style sheet will automatically pick up the changes. At step 506, the CMS stores the new configuration file in the CMS repository, replacing the prior version of the configuration file. If the new file adds an additional configuration file to the configuration set, the CMS 130 may update the configuration set to include a reference to the new file. Additionally, the prior version may be archived. This may be useful for documents bound to a specific version or instance of a configuration file.

FIG. 5B illustrates a method 510 for creating a new configuration set, according to one embodiment of the invention. The method 510 begins at step 512 where the user imports or specifies a collection of configuration files to associate with a new configuration set. At step 514, CMS 130 may prompt the user to specify a name for the new configuration set and specify which document types may be bound to the new configuration set. Additionally, the configuration set may be configured for use with a document type having particular attributes (e.g., like the region attribute used to select a configuration set of the "eCTD module 1" document described above) appropriate for a particular document. In such a case the attributes of a document associated with the new configuration set may be specified as well. At step 516, CMS 130 stores the new configuration set in CMS repository 124. For example, the method 510 may be performed by an administrator interacting with CMS 130 to import new DTDs and/or style sheets with a unique name (relative to CMS repository 124) and create a new configuration set to reference the specified configuration files. This scenario is useful for making incompatible changes to a DTD or XML schema (e.g. moving to a new major version). Once imported into the CMS repository 124, the new configuration set is available for binding to documents of the appropriate document type.

FIG. 5C illustrates a method 520 for modifying the status of a configuration set 214, according to one embodiment of the invention. More specifically, method 520 may be used to modify the status of a configuration set to obsolete. Generally, an obsolete configuration set may no longer be available for binding to new documents. However, such a configuration set may be associated with any number of documents in CMS repository 124.

The method 520 begins at step 522 where the status for an existing confirmation set 214 is set to obsolete. For example, a CMS administrator may interact with CMS user interface 202 to select an existing configuration set 214 and set the status to obsolete. At step 524, CMS 130 may be configured to identify which documents managed by CMS 130 are currently bound to the now obsolete configuration set. At step 526, the owners of documents identified at step 524 may be notified that the configuration set for the document is now obsolete. Alternatively, if the configuration set being set to obsolete is being replaced with a new one, then any documents currently bound to the now obsolete configuration may be automatically bound to the replacement one.

Figure 6:
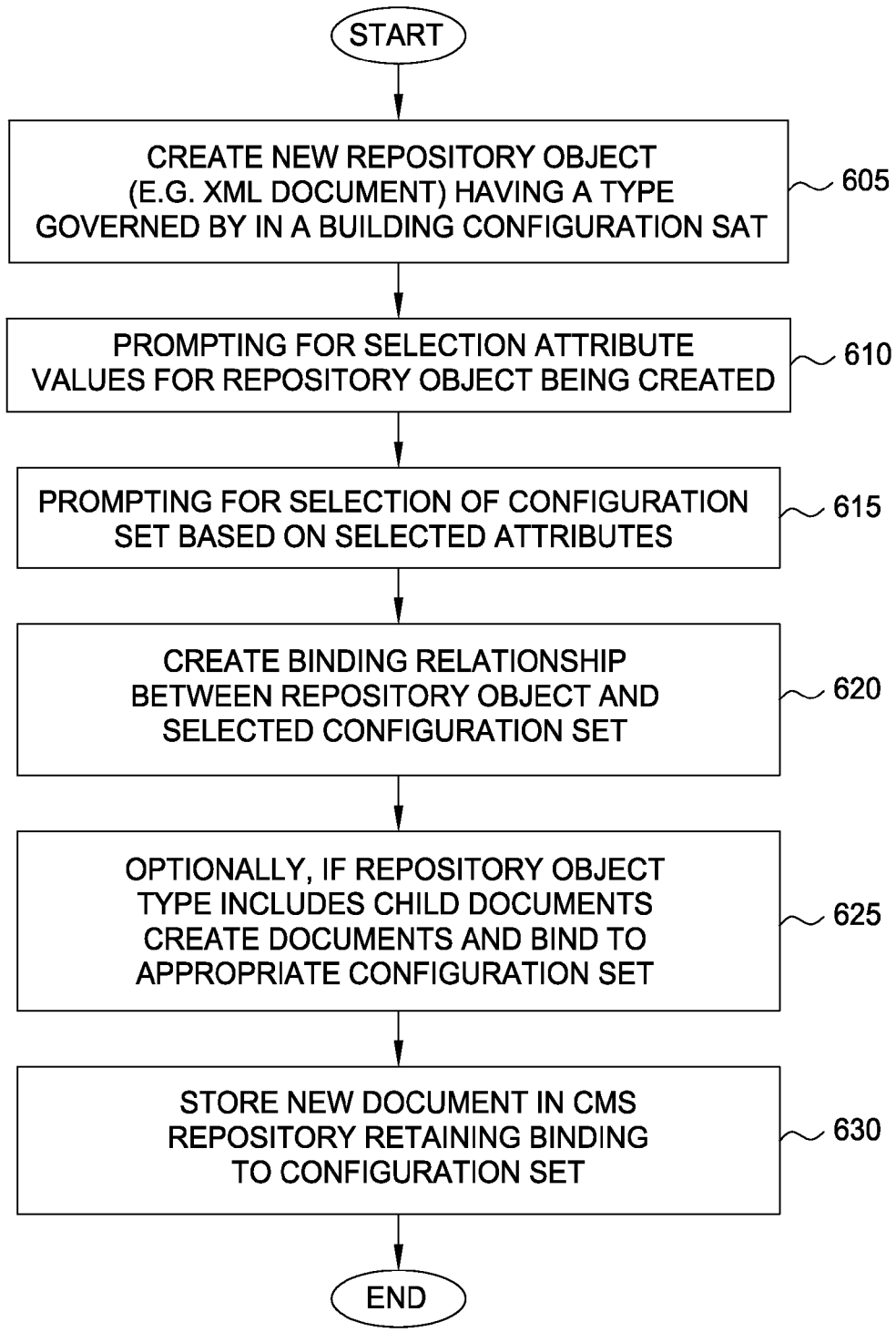
FIG. 6 illustrates a method for creating a new document managed by a CMS and binding the document to an appropriate configuration set, according to one embodiment of the invention.

FIG. 6 illustrates a method 600 for creating a new document managed by CMS 130 and binding the new document to an appropriate configuration set 214, according to one embodiment of the invention. The method 600 begins at step 605 when CMS 130 receives a request to create a new document to store in the CMS repository 124. Typically, a user interacts with client application 108 to create a new document associated with a document type that may be bound to a configuration set. For example, a user may select to create a new eCTD root document and bind the new eCTD root document to a selected configuration set.

At step 610, CMS 130 may prompt the user to specify the desired attributes for the new document. Using the eCTD document type as an example, the user may be prompted to provide a name, version, and region attributes, among others, for the new eCTD document. At step 615, the user may be presented with a list of configuration sets appropriate for the type of document being created and based on the attributes for that document specified in step 615. For an eCTD document type, configuration sets 214 may be based on the region specified for the document. Of course, the attributes used to filter the available choice of configuration sets may be tailored to suit the needs in a particular case. Further, if a document type is associated with a single configuration set, then CMS 130 may bind a new document of this type without prompting for any additional attributes at all.

Additionally, CMS 130 may be configured to allow multiple versions of a particular configuration set to be active at the same time. This may be useful when a new version of configuration files associated with the configuration set is available, but not yet required for use. As stated earlier, for example, a company could have version 3.0 and 4.0 of an XML grammar in use at the same time. In such a case, when the user tries to create a new XML document based on specification 3.0, CMS 139 may be configured to inform the user that the 3.0 selection is not preferred, as it is being phased out. Accordingly, if user selects a configuration set 214 that references a configuration file 213 that has a planned obsolescence, CMS 130 may provide a warning that a selected configuration set will become obsolete at a specified date in the future. Further, if the CMS may be configured to enforce the version update, in which case, the CMS may change the user's selection to the new version.

At step 620 the document being created is bound to the configuration set selected at step 615. The CMS 130 creates a repository relationship reflecting the new document and binding to the selected configuration set. Additionally, at step 625, if the document being created includes references to child documents or sub-documents, such as the eCTD backbone, then CMS 130 may generate these documents and bind them to the appropriate configuration sets as well. At step 630, the new document may be stored in CMS repository 124 and returned for editing or other access by the user.

Advantageously, when a user later accesses the new document (e.g., checks out or checks in the document), CMS 130 may determine the configuration set bound to the document in order to perform XML-specific services such as validation, chunking, and attribute synchronization. Further, if a change is made to the configuration set bound to a given document, and source documents are bound to the latest version of that configuration set, then the document will automatically see new changes to the configuration set (e.g., when a new element is added to the schema, or a new style sheet is added).

While the foregoing is directed to embodiments of the present invention, other and further embodiments of the invention may be devised without departing from the basic scope thereof, and the scope thereof is determined by the claims that follow.

What is claimed is:

1. A method of managing documents in a content management system (CMS), the method comprising:
   receiving a request to create a document of a specified document type;
   prompting a user to specify one or more attributes associated with the document;
   based on the specified attributes and the specified document type, selecting a configuration set for the document, wherein the configuration set specifies one or more configuration files that include content for managing the document;
   determining whether the selected configuration set has a planned obsolescence, and upon determining that the selected configuration set has a planned obsolescence, warning the user of the planned obsolescence;
   generating the requested document by:
      generating a root document including references to one or more child documents,
      selecting a configuration set for each of the one or more child documents, and
      binding the root document to the configuration set selected for each of the one or more child documents, wherein the root document remains independent from the one or more child documents; and
   binding the document to the selected configuration set.

2. The method of claim 1, wherein selecting a configuration set for the document comprises prompting the user to select from two or more configuration sets.

3. The method of claim 1, wherein binding the document to the selected configuration set comprises generating a repository relation specifying the document and the selected configuration set.

4. The method of claim 1, wherein the method further comprises updating at least one of the configuration files of the selected configuration set with a new version, and wherein the binding between the document and the selected configuration set automatically reflects the new version when the document is subsequently accessed.

5. The method of claim 1, wherein the configuration files include at least one of an XML schema, a document type definition (DTD), an XSL style sheet, an XML catalog, and an XSLT transform.

6. The method of claim 1, wherein the selected configuration set includes one or more processing rules used by the CMS to manage the document.

7. The method of claim 1, further comprising:
   transitioning a state of the selected configuration set to an obsolete state;
   identifying a document managed by the CMS bound to the selected configuration set; and
   notifying an owner of the document managed by the CMS bound to the selected configuration set that the selected configuration set is obsolete.

8. A computer-readable storage medium containing a program which, when executed, performs an operation for managing documents in a content management system (CMS), the operation comprising:
   receiving a request to create a document of a specified document type;
   prompting a user to specify one or more attributes associated with the document;
   based on the specified attributes and the specified document type, selecting a configuration set for the document, wherein the configuration set specifies one or more configuration files that include content for managing the document;
   determining whether the selected configuration set has a planned obsolescence, and upon determining that the selected configuration set has a planned obsolescence, warning the user of the planned obsolescence;
   generating the requested document by:
      generating a root document including references to one or more child documents,
      selecting a configuration set for each of the one or more child documents, and
      binding the root document to the configuration set selected for each of the one or more child documents, wherein the root document remains independent from the one or more child documents; and
   binding the document to the selected configuration set.

9. The computer-readable storage medium of claim 8, wherein selecting a configuration set for the document comprises prompting the user to select from two or more configuration sets.

10. The computer-readable storage medium of claim 8, wherein binding the document to the selected configuration set comprises generating a repository relation specifying the document and the selected configuration set.

11. The computer-readable storage medium of claim 8, wherein the operation further comprises updating at least one of the configuration files of the selected configuration set with a new version, and wherein the binding between the document and the selected configuration set automatically reflects the new version when the document is subsequently accessed.

12. The computer-readable storage medium of claim 8, wherein the configuration files include at least one of an XML schema, a document type definition (DTD), an XSL style sheet, an XML catalog, and an XSLT transform.

13. The computer-readable storage medium of claim 8, wherein the selected configuration set includes one or more processing rules used by the CMS to manage the document.

14. The computer-readable storage medium of claim 8, wherein the operation further comprises:
   transitioning a state of the selected configuration set to an obsolete state;
   identifying a document managed by the CMS bound to the selected configuration set; and
   notifying an owner of the document managed by the CMS bound to the selected configuration set that the selected configuration set is obsolete.

15. A system comprising:
   a processor; and
   a memory including a content management system (CMS) configured to perform a method for managing documents in a content management system, the method comprising:
      receiving a request to create a document of a specified document type;
      prompting a user to specify one or more attributes associated with the document;
      based on the specified attributes and the specified document type, selecting a configuration set for the document, wherein the configuration set specifies one or more configuration files that include content for managing the document;

determining whether the selected configuration set has a planned obsolescence, and upon determining that the selected configuration set has a planned obsolescence, warning the user of the planned obsolescence;

generating the requested document by:
  generating a root document including references to one or more child documents,
  selecting a configuration set for each of the one or more child documents, and
  binding the root document to the configuration set selected for each of the one or more child documents, wherein the root document remains independent from the one or more child documents; and
binding the document to the selected configuration set.

16. The system of claim 15, wherein binding the document to the selected configuration set comprises generating a repository relation specifying the document and the selected configuration set.

17. The system of claim 15, wherein the method further comprises updating at least one of the configuration files of the selected configuration set with a new version, and wherein the binding between the document and the selected configuration set automatically reflects the new version when the document is subsequently accessed.

18. The system of claim 15, wherein the configuration files include at least one of an XML schema, a document type definition (DTD), an XSL style sheet, an XML catalog, and an XSLT transform.

19. The system of claim 15, wherein the selected configuration set includes one or more processing rules used by the CMS to manage the document.

20. The system of claim 15, wherein the CMS is further configured to:
  transition a state of the selected configuration set to an obsolete state;
  identify a document managed by the CMS bound to the selected configuration set; and
  notify an owner of the document managed by the CMS bound to the selected configuration set that the selected configuration set is obsolete.

* * * * *